(12) United States Patent
Gauss

(10) Patent No.: US 6,363,960 B1
(45) Date of Patent: Apr. 2, 2002

(54) FROST PROTECTION DEVICE

(76) Inventor: Dieter Gauss, Taberwasen 3, D-72160 Horb (DE)

( * ) Notice: Subject to any disclaimer, the term of this patent is extended or adjusted under 35 U.S.C. 154(b) by 0 days.

(21) Appl. No.: 09/647,758

(22) PCT Filed: Feb. 19, 1999

(86) PCT No.: PCT/DE99/00471

§ 371 Date: Jan. 10, 2001

§ 102(e) Date: Jan. 10, 2001

(87) PCT Pub. No.: WO99/51823

PCT Pub. Date: Oct. 14, 1999

(30) Foreign Application Priority Data

Apr. 3, 1998 (DE) .......................................... 198 14 974
Nov. 13, 1998 (DE) .......................................... 198 52 483

(51) Int. Cl.[7] .......................... F16L 55/07; F16K 24/04; E03B 7/08; E03B 7/12
(52) U.S. Cl. .............................. 137/60; 119/73; 119/75; 137/62
(58) Field of Search .............................. 137/59, 60, 62; 119/62, 73, 75

(56) References Cited

U.S. PATENT DOCUMENTS

| | | | | |
|---|---|---|---|---|
| 1,744,407 A | * | 1/1930 | Louden ........................ | 119/75 |
| 1,878,002 A | * | 9/1932 | Smith ........................... | 137/60 |
| 2,995,140 A | * | 8/1961 | Managhan ................... | 137/60 |
| 3,380,464 A | * | 4/1968 | Arterbury et al. ............. | 137/60 |
| 3,446,226 A | * | 5/1969 | Canterbury ................... | 137/62 |
| 3,464,391 A | * | 9/1969 | Prentice ....................... | 119/75 |
| 3,618,625 A | * | 11/1971 | Walters ........................ | 119/73 |
| 4,397,266 A | * | 8/1983 | Noland et al. ................. | 119/73 |
| 4,437,481 A | * | 3/1984 | Chamberlin et al. .......... | 137/60 |
| 4,471,722 A | * | 9/1984 | Dube et al. ................... | 119/75 |
| 4,476,812 A | * | 10/1984 | Dube et al. ................... | 119/75 |
| 4,476,813 A | * | 10/1984 | Haiges ......................... | 119/75 |
| 4,538,791 A | * | 9/1985 | Wostal ......................... | 119/75 |
| 4,776,362 A | * | 10/1988 | Domingue, Sr. et al. ..... | 137/59 |
| 4,784,173 A | * | 11/1988 | Carney ......................... | 137/60 |
| 4,967,780 A | * | 11/1990 | Minami ........................ | 137/60 |
| 5,715,855 A | * | 2/1998 | Bennett ........................ | 137/60 |

FOREIGN PATENT DOCUMENTS

CA 447072 * 3/1948 ................. 137/60

* cited by examiner

Primary Examiner—George L. Walton
(74) Attorney, Agent, or Firm—Orum & Roth

(57) ABSTRACT

This invention relates to a frost protection device for preventing sections of water pipes which are in danger of being affected by frost from freezing up. Said frost protection device consists essentially of a pressure control valve with a piston-type valve body which moves axially in a cylindrical housing. The pressure control valve also interacts with a valve seat which is connected to the section of pipe being monitored. According to the invention, the valve seat is located outside of the flow path defined by the section of pipe, in a branch which constantly communicates with said section of pipe.

12 Claims, 1 Drawing Sheet

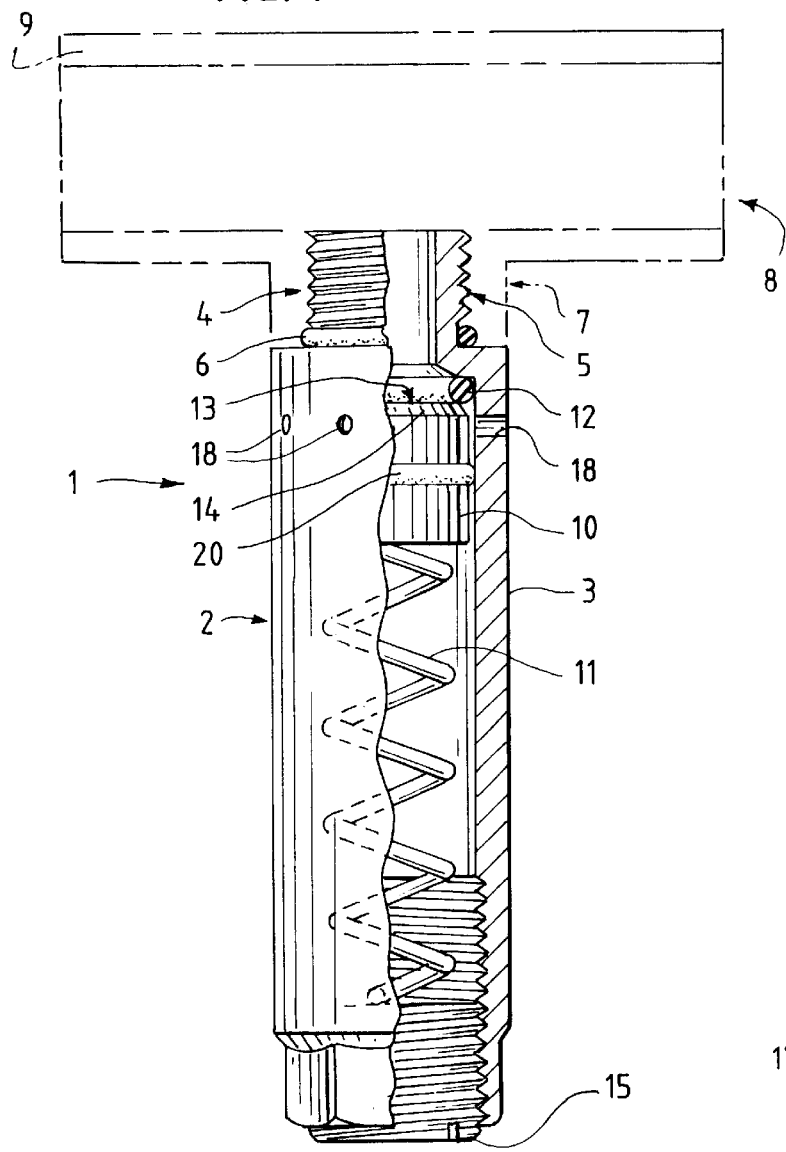
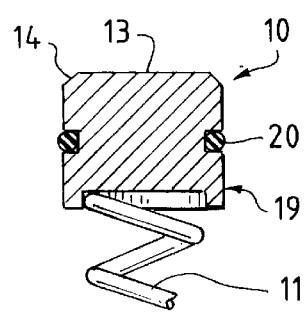
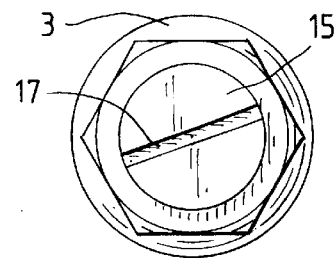
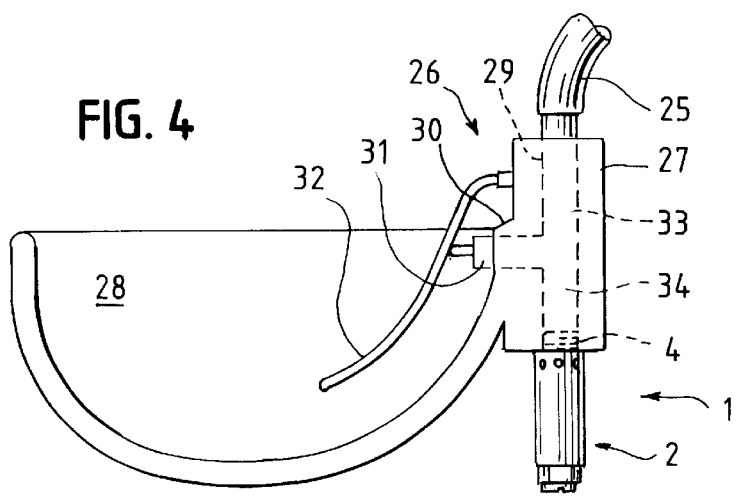

FROST PROTECTION DEVICE

The invention is based on an anti-freezing device for preventing the freezing of pipe sections disposed outdoors or in temporarily undercooled rooms, filled with water of a certain overpressure and forming a flow path for the water, particularly in the area of fittings in accordance with the type of the main claim.

It is known in the art to protect water pipe sections against freezing in areas which are subject to freezing in that heating coils or other heating equipment are mounted directly on the water pipes. Heat insulation can also be installed. The insulation may make accessing the pipes more difficult or even impossible because the fittings must not lead to the outside, and heating equipment usually is very expensive in terms of production and installation and it is disadvantageous because of a continuous energy consumption. Also, the heating coils known in the art, for example, do not provide adequate frost protection in the area of watering troughs for horses or other fittings if only the water supplying pipe sections are heated. For this reason, plastic stoppers are provided, for example, in many watering troughs for horses in the area of the fittings which are subject to freezing. The stoppers are designed to break open at the overpressure occurring when the water freezes so as to prevent the watering trough from bursting. In practical application, however, it was found that said plastic stoppers are unable to ensure adequate protection against frost damage. Another disadvantage is that when the plastic stopper breaks open a permanent leak will develop through which water from the pipe can flow out uncontrollably.

In order to prevent frost damage on pipes it was previously proposed to install suitable pressure control valves. Such a pressure control valve has a valve seat which is in communication with the pipe section to be monitored and which interacts with a movable valve body so as to seal the pipe section, where the valve body is prestressed in a closed position in such a way that the pressure control valve is closed when the overpressure is normal and that it opens when the pressure increases as a result of the water freezing so as to drain a water quantity from the pipe section. Because theoretically, the pipe or the like will start freezing from the inside of the pipe close to the wall in the direction to the central pipe axis it was proposed in the German patent DE 827 629 or in the U.S. Pat. No. 4,776,362, for example, to dispose the pressure control valve partially on the inside of the pipe such that the part of the valve containing the valve seat is shifted inward away from the inside surface of the pipe wall or the like. This is intended to achieve that the area of the valve seat is still disposed in warmer, flowing water near the pipe axis when the freezing begins with the related increase in pressure so as to prevent the valve from freezing and to allow fluid to drain through the pressure control valve. One disadvantage of the above solutions is that the valve parts mounted on the inside of the pipe create obstacles for the flow which impair both the free flow through the pipe sections in normal operation and they also create places favoring deposits which could gradually affect a pipe and thus make it unusable.

Compared to the above, the anti-freezing device of the invention having the characteristic features of claim 1 has the advantage that the flow through the monitored pipe section is not hampered or impaired by parts of the anti-freezing device.

This is achieved in that the valve seat is disposed at a distance from the flow path outside the flow path in a branch which is in continuous communication with the pipe section.

Surprisingly, it was found that the function of such anti-freezing devices is reliably ensured although the area of the valve seat, contrary to the theories of the above prior art, is not in the axial range of the flow path to be monitored. Using a branch on the monitored pipe section also offers advantages with regard to the freedom of the spatial arrangement of the pressure control valve relative to the monitored pipe or the fittings. Tests have shown that freezing can be reliably prevented by means of the invention to −15° C. The use of the invention is not limited to watering troughs for animals, such as horses, cattle, hogs or the like where pipe sections and/or fittings are frequently located in areas which are subject to freezing as a result of increasingly keeping the animals outdoors again. The invention is also able to reliably solve anti-freezing problems in the field of water supply for mobile homes and the like, on campgrounds, in gardens, garages, etc.

According to an advantageous embodiment of the invention the branch is or can be substantially oriented vertically so as to support the discharge of the water caused by the freezing-related overpressure by means of gravity.

According to a further embodiment of the invention the branch has a front side opposite the monitored pipe section and the pressure control valve is or can be disposed on the front side of the branch. This can facilitate the installation and allows largely straight flow paths which support the flow.

An embodiment of the invention provides for the branch to be oriented transversely, preferably substantially vertical to the flow path of the pipe water, where the branch is preferably provided on a tee which can be installed in the pipe section. The installation of such a tee in the area of the pipes which is subject to freezing allows retrofitting of existing pipes with the pressure control valves of the invention without significant effort.

According to another embodiment, the pipe section has two partial sections which are preferably oriented at right angles relative to each other so as to form an angled flow path and the branch is disposed substantially so as to lengthen a partial section, preferably the inlet-side partial section. This allows the water flowing into the pipe section to reach the valve opening of the pressure control valve substantially without changing the direction of flow, thereby allowing particularly favorable flow conditions for the fluid flowing out at times of frost danger. In particular, subsequently following warmer water is able to flow particularly rapidly into the area which is subject to freezing so as to protect it against freezing.

In a particularly preferred embodiment the monitored pipe section is provided in a basic fitting body of a watering trough for animals, particularly a watering trough for cattle or horses, and the pressure control valve is configured so as to screw into a threaded bore of the fitting body which is in communication with the pipe section. This allows, in a very simple manner, the use of the threaded bores for receiving the above described plastic stopper which are provided on most watering troughs for animals, particularly watering troughs for horses, so as to cost-effectively mount an anti-freezing device of the invention without any structural changes in the fittings, even in previously installed watering troughs or the like.

In an advantageous embodiment, the closing pressure of the valve body is, preferably continuously, adjustable. This makes it particularly easy to adapt the anti-freezing device to the normal water pressure prevailing at the installation site. This is particularly advantageous for watering systems having a number of cattle or horse watering troughs or the like which are installed at a distance from each other on a supply line because the water pressures prevailing at the installation site of the individual watering troughs can differ considerably. The adjustment can be made separately for each valve, for example in that the pressure control valve remains just closed at ambient temperatures of approx. 5 to approx. 30° C. and then automatically opens slightly and temporarily when the temperature drops toward the freezing point.

A particularly simple design of the anti-freezing device is obtained with a preferred embodiment in that the pressure control valve has a cylindrical, shell-like valve housing in which a valve body, which is preferably configured as a plunger, spring-loaded by means of a pressure spring, is guided so as to move. The valve housing preferably has a connecting sleeve at its top end and at its bottom end an axial thread for an adjusting screw engaging therein on which the pressure spring is supported, which on the other side pushes against the underside of the valve body opposite the valve seat. In closed valve position, the valve body can seal discharge openings provided in the valve housing relative to the connecting sleeve and in open position release them or connect them with the monitored pipe section, respectively.

In a preferred embodiment, the connecting sleeve has an external thread allowing the pressure control valve to be mounted in a simple manner, particularly without soldering or welding, for example in the above described receiving bore for the plastic anti-freezing stopper or at a front end of a branch, which is provided with an internal thread, on a tee or also in a suitably dimensioned threaded bore in a wall of a pipe, fitting or container. The branch can be formed partially or substantially completely by the connecting sleeve which is preferably configured in one piece with the valve housing.

The shell-like valve housing can be manufactured very easily of metal, such as brass, or of plastic, particularly POM, which allows holding the production costs very low. The outside contour can be substantially circular cylindrical, but if required, it can also have a hexagonal configuration, at least in sections, so as to allow the pressure control valve to be screwed in comfortably by means of a suitable wrench or a pipe wrench or the like. If required, the installation can also be achieved without any tools, i.e. manually. In this case, an at least sectionally non-circular, for example hexagonal outside contour is also advantageous.

For a better sealing of the valve body, particularly the plunger, relative to the inside wall of the valve housing, the plunger is preferably provided with at least one O-ring or a toroidal sealing ring.

The valve seat in the valve housing can be formed by a toroidal sealing ring or an O-ring against which the valve body rests, for example with its front surface or a conical ring surface in the closed position of the valve.

Instead of the O-ring another sealing ring having the respective sealing properties can also be used. Instead of a uniaxial rotationally symmetrical valve body having at least in sections a circular cylindrical or conical surface area the valve body can also be a ball, particularly of rubber.

According to an embodiment of the invention, above the sealing contact between the valve body and the inside housing wall, particularly above the O-ring disposed on the surface area of the valve body or the plunger, respectively, one or more discharge openings are provided in the wall of the valve housing, which can be configured particularly simply as bores. When the anti-freezing device opens its valve the water can flow out of the area which is subject to freezing via the discharge openings so as to prevent freezing as a result of the flow movement. The seal on the plunger then prevents water from entering the space of the valve housing containing the pressure spring where it could possibly impair the function of the valve as a result of freezing.

Further advantages and advantageous embodiments of the invention are found in the following description, the drawings and the claims.

Exemplary embodiments of the subject matter of the invention are shown in the drawings and will be described below in more detail, as follows:

FIG. 1 an embodiment of an anti-freezing device in a partial longitudinal section, FIG. 2 a longitudinal section of the plunger used in the anti-freezing device of FIG. 1.

FIG. 3 a top view of the underside of the anti-freezing device of FIG. 1, and

FIG. 4 a schematic representation of a watering trough for horses with the anti-freezing device of FIG. 1.

The anti-freezing device 1 shown in FIG. 1 substantially comprises a pressure control valve or a pressure relief valve 2, respectively, having a shell-like relatively thin walled, substantially circular cylindrical valve housing 3 of metal, for example of corrosion-resistant brass. The valve housing can also cost-effectively be made of a suitable plastic material, such as POM.

At the top end of the valve housing, which when installed is preferably oriented vertically, a connecting sleeve 4 having an exterior thread 5 is configured in one piece with the valve housing. A sealing ring 6 encompassing the connecting sleeve 4 at the transition to the circular cylindrical part of the valve housing allows a simple secure sealing in the area of the respective place of connection. In the area of the cylinder section which is close to the thread a ring is provided in the wall of the valve housing having six radial bores 18 of approx. 1 mm in diameter which are distributed over the circumference of the valve housing. At the bottom end of the valve housing the latter has the outside contour of a hexagonal screw nut (also see FIG. 3). In this area, a suitable tool can be used for mounting, i.e. for screwing the anti-freezing device in or out. The outside contour can also be hexagonal over the full length, for example, which also favors a potential manual installation.

In the embodiment shown, the pressure control valve 2 is screwed to a radial branch 7 . . .

In the example, the tee has a horizontal pipe section 9 at whose center the branch 7 having the same diameter radially branches off downward. The tee can be installed in the section of a water pipe which is subject to freezing by means of a usual method in such a way that the flow path of the water flowing through the pipe leads through the pipe section 9 into which the branch leads radially. The pressure control valve which is screwed in to the stop at the front side of the branch and which is sealed relative to the tee by means of the seal 6 ends with the end of the threaded connecting piece approximately flush with the inside of the pipe 9 so that no part of the valve projects into the horizontal flow path where it could impair the flow.

In the valve housing 3 an axially moving plunger 10 is installed which is also easily seen in FIG. 2. It forms the valve body of the pressure control valve and it is pushed by means of a pressure spring 11 against a toroidal sealing ring 12 which is disposed at the top end of the circular cylindrical area of the housing interior at the change-over to a section tapering conically toward the connecting sleeve 4. The toroidal sealing ring or the O-ring 12, respectively, forms the valve seat of the pressure control valve 2. Exactly like the sealing ring 6, it preferably consists of a silicon material which is elastic even at freezing temperatures. The valve seat is disposed outside of the flow path through the pipe 9 and at a distance from the flow path which is substantially determined by the axial length of the threaded connecting piece. The front surface 13 of the plunger facing the valve seat 12 changes in the edge area to a conical ring surface 14 which abuts on the O-ring 12 in closed valve position.

The pressure spring 11 which is configured as a helical spring is supported on one side by the underside of the plunger 10 and on the other side by the top side of an axially continuously adjustable adjusting screw 15 which is screwed into an axial interior thread 16 provided at the bottom end of the valve housing 3.

To secure the pressure spring 11 against slipping the top side of the adjusting screw 15 has an indentation, exactly as the underside of the plunger 10 shown in FIG. 2, in which the pressure spring rests with its end. If the adjusting screw 1 is screwed further into the valve housing 3 the pressure applied by the pressure spring 11 on the plunger 10 against the valve seat 12 increases. This is how the pressure can be adjusted with which the plunger 10 abuts on the O-ring 12 which acts as the valve seat, so that in frost-free operation, particularly at temperatures ranging from approx. 5 to approx. 30° C. the pressure control valve will remain in just closed position shown, in which the connected pipe section is sealed so as to be watertight against the outside and the interior of the pressure control valve, whereas when the pressure increases in the pipe as a result of freezing it opens and releases the path between the pipe and the discharge openings. The adjustment of the closing pressure or the adjustment of the switching pressure of the pressure control valve can be achieved very easily using a standard screwdriver or another suitable tool, such as a pocketknife or a coin. For this purpose, a slot 17 for inserting the tool is provided on the underside of the adjusting screw 15 shown in FIG. 3. Instead, a hexagonal receptacle can be provided, for example, for an adjustment key which makes it more difficult for an unauthorized individual to change the setting.

The anti-freezing device functions as follows: At temperatures above approx. 5° C. the water in the pipe 9 is in liquid state and the pressure control valve is in the closed position as shown in FIG. 1. A connected fitting is shut off so that the water remains stationary in the pipe. When the temperature drops and the water temperature approaches 0° C. the stationary water in the monitored pipe will expand below approx. 4° C. which causes the internal pressure in the pipe to increase.

The plunger 10 is then pressed downward from the closed position shown to an open valve position as a result of an increase in the interior pipe pressure which is transferred via the connecting sleeve 4 against the pressure of the pressure spring 11. As soon as the plunger lifts off of the valve seat 12 the water from the pipe section 9 can flow through the connecting sleeve 4, laterally past the plunger 10, to the outside via the discharge openings 18. To ensure that no water can enter the space containing the pressure spring 11 a toroidal sealing ring 20 inserted in a receiving groove is provided on the circular cylindrical surface area 19 of the plunger 10 sealing the ring gap between the plunger exterior and the inside of the valve housing.

FIG. 1 shows that the valve seat in whose range the sealing ring 12 and the top side of the plunger 10 interact so as to seal the pipe is outside the flow path formed by the pipe section 9, where the distance between the central axis of the monitored pipe and the range of the valve seat corresponds approx. to two to three times the pipe radius. The flow path itself is not affected by the mounting of the pressure control valve insofar as no part of the pressure control valve screwed into the branch 7 projects into the flow path.

In the preferred application of the pressure control valves of the invention shown in FIG. 4, a pressure control valve of the design shown in FIG. 1 is disposed in the area of a watering trough 26 for horses installed at the end of a water pipe 25. The watering trough for horses has a basic fitting body 27 on which a bowl-shaped watering container 28 is mounted so as to form one piece. On the inside of the basic fitting body a vertically continuous through-channel 29 is provided extending in the body's longitudinal direction from whose center a one-sided radial channel 30 branches off in the direction of the watering bowl.

A valve 31 is installed in said channel, which can be opened by a horse, for example, by means of pressure applied to a control lever 32 which is hinged to the top area of the basic fitting body so that water will flow into the watering container.

At the top end of the through-channel 29 the end of the water pipe 25 is screwed in while at the opposite bottom end the pressure control valve 2 is screwed in to the stop with its threaded connecting piece 4 in an interior thread which usually serves to receive a plastic freeze protection stopper. If required, screwing in can be accomplished manually by rotating the entire pressure control valve relative to the basic fitting body. In this application, the flow path used in operation between the end of the water pipe and the valve 31 is bent at right angles and is formed by a top partial section 33 of the through bore and by the radial bore 30. The bottom partial section 34 of the through-channel 29 forms a branch on whose front side the pressure control valve is mounted. Its inlet opening or valve seat, respectively, is a lengthening of the part of the monitored pipe section formed by the top section 33 of the through-opening 29, where the distance between said pipe section and the valve seat corresponds to approx. four times the diameter of the monitored pipe. In this case, the flow is also not impaired in any way by the mounted anti-freezing device during normal operation of the horse watering trough.

All the characteristic features in the specifications, in the following claims and shown in the drawing can be essential to the invention, both separately and in any desired combination.

What is claimed is:

1. Anti-freezing device for preventing the freezing of a water pipe forming a flow path for water, disposed outdoors or in temporarily undercooled rooms, and having a pressure control valve (2) which has a valve housing (3) and which has at least one valve seat (12) therein which is in communication with the pipe and interacts with a valve body (10) so as to seal the pipe, where the valve body is prestressed by a pressure spring into a closed position such that the pressure control valve is normally closed and opens when the pressure within the pipe increases as a result of the water freezing so as to drain a water quantity from the pipe, wherein;

the pressure spring has a variable tension set by an adjusting screw;

the valve seat (12) is disposed at an upper portion of the valve housing (3);

the valve housing (3) removably secured to a branch which is in communication with the pipe, having a plurality of discharge openings (18) provided in a wall of the valve housing, where the valve body in the closed position seals the discharge openings (18) relative to the valve seat (12);

the valve body (10) on its surface area (19) has at least one sealing ring (20) which seals a ring gap between the valve body and an inside wall of the valve housing; and the plurality of discharge openings (18) are in an area between the valve seat (12) and the sealing ring (20).

2. Anti-freezing device according to claim 1, characterized in that the branch (7; 34) is or can be substantially oriented vertically.

3. Anti-freezing device according to claim 1, characterized in that the branch (7; 34) has a front side opposite the pipe section (9; 30, 33) and that the pressure control valve (2) is or can be disposed on the front side, particularly that it can be screwed in.

4. Anti-freezing device according to claim 1, wherein: the branch (7) is oriented transverse, in particular substantially vertically to the flow path, where the branch is provided on a tee (8) which can be installed in a pipe.

5. Anti-freezing device according to claim 1, wherein: the pipe section has two partial sections (33, 30) for forming an angled flow path which are oriented at right angles relative to each other and that the branch (34) is substantially disposed so as to lengthen a partial section, an inlet-side partial section (33).

6. Anti-freezing device according to claim 1, wherein: the pipe section (33, 30) is provided in a basic fitting body (27) of a watering trough for animals, where the pressure control valve (2) is configured so as to screw into a threaded bore of the basic fitting body which is in communication with the pipe section.

7. Anti-freezing device according to claim 1, wherein: the pressure control valve (2) can be mounted into the pipe to be monitored without using any tools.

8. Anti-freezing device according to claim 1, wherein: the pressure control valve has a, continuous, adjustable closing pressure.

9. Anti-freezing device according to claim 1, wherein: the pressure control valve (2) has a valve housing (3) in which a valve body, which is spring-loaded by means of the pressure spring (11), configured as a plunger (10), is guided so as to move, where the valve housing (3) at its top end has a connecting sleeve (4), which is provided with an exterior thread (5), and at its bottom end has an axial thread (16), for an adjusting screw (15), and where the pressure spring is supported on one side by the adjusting screw and on the other side by the underside of the valve body.

10. Anti-freezing device according to claim 9, characterized in that the valve housing (3), preferably at its end opposite the connecting sleeve, has an axial section having the outside contour of a hexagonal screw nut.

11. Anti-freezing device according to claim 1, wherein: the valve housing is provided with a toroidal sealing ring (12) forming the valve seat on which the valve body (10) abuts so as to seal in the closed valve position.

12. Anti-freezing device according to claim 1 wherein: the valve body is a ball.

* * * * *